(12) United States Patent
Yan et al.

(10) Patent No.: US 11,598,524 B2
(45) Date of Patent: Mar. 7, 2023

(54) HIGH-EFFICIENT CLEAN, HIGH-VARIABLE LOAD RATE COAL-FIRED POWER GENERATION SYSTEM AND OPERATION METHOD THEREOF

(71) Applicant: XI'AN JIAOTONG UNIVERSITY, Shaanxi (CN)

(72) Inventors: Junjie Yan, Shaanxi (CN); Ming Liu, Shaanxi (CN); Jiping Liu, Shaanxi (CN); Daotong Chong, Shaanxi (CN); Qinan Xing, Shaanxi (CN); Chaoyang Wang, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 0 days.

(21) Appl. No.: 17/615,105

(22) PCT Filed: Jan. 25, 2021

(86) PCT No.: PCT/CN2021/073590
§ 371 (c)(1),
(2) Date: Nov. 30, 2021

(87) PCT Pub. No.: WO2021/238278
PCT Pub. Date: Dec. 2, 2021

(65) Prior Publication Data
US 2022/0146096 A1   May 12, 2022

(30) Foreign Application Priority Data

May 24, 2020 (CN) .................. 202010445472.3

(51) Int. Cl.
*F23J 15/08* (2006.01)
*B01D 53/86* (2006.01)
*B01D 53/88* (2006.01)

(52) U.S. Cl.
CPC .......... *F23J 15/08* (2013.01); *B01D 53/8621* (2013.01); *B01D 53/8696* (2013.01);
(Continued)

(58) Field of Classification Search
None
See application file for complete search history.

(56) References Cited

U.S. PATENT DOCUMENTS

| 4,029,952 A | * | 6/1977 | Giras | ........................ F01K 7/24 |
| | | | | 290/40 R |
| 5,738,024 A | * | 4/1998 | Winegar | ............ B01D 53/8631 |
| | | | | 110/345 |

(Continued)

FOREIGN PATENT DOCUMENTS

| CN | 203829919 U | 9/2014 |
| CN | 106642177 A | 5/2017 |

(Continued)

*Primary Examiner* — Colin W. Slifka
*Assistant Examiner* — Michael Forrest

(57) ABSTRACT

In a high-efficient clean, high-variable load rate coal-fired power generation system, through the internal thermal source SCR denitration catalytic module coupled with high temperature and low temperature storage tanks, the operating temperature of the internal thermal source SCR denitration catalytic module is controlled in a range of 300° C. to 400° C., ensuring that the SCR catalyst has high activity in full-working conditions. Moreover, the high temperature and low temperature storage tanks are coupled with the high-pressure heater group for steam turbine regenerative system, so that when the coal-fired unit needs to increase load rate, the thermal storage energy is quickly converted into output power. In addition, energy stored in the high temperature and low temperature storage tanks come from both the internal thermal source SCR denitration catalytic (Continued)

module and the thermal storage medium heater within the boiler, the operational flexibility and the boiler efficiency are improved.

2 Claims, 2 Drawing Sheets

(52) U.S. Cl.
CPC .......... *B01D 53/88* (2013.01); *F23J 2215/10* (2013.01); *F23J 2900/15081* (2013.01)

(56) References Cited

U.S. PATENT DOCUMENTS

| | | | |
|---|---|---|---|
| 2008/0299016 | A1 | 12/2008 | Sobolevskiy et al. |
| 2011/0041783 | A1* | 2/2011 | Bruckner ............... B01D 53/56 |
| | | | 122/7 R |
| 2014/0007823 | A1* | 1/2014 | Qian ........................ F22D 1/50 |
| | | | 122/421 |
| 2015/0143811 | A1* | 5/2015 | Pang ........................ F02C 6/18 |
| | | | 60/39.5 |

FOREIGN PATENT DOCUMENTS

| | | |
|---|---|---|
| CN | 109945223 A | 6/2019 |
| CN | 111636934 A | 9/2020 |
| JP | 09159140 A | 6/1997 |
| JP | 2012239970 A | 12/2012 |

* cited by examiner

HIGH-EFFICIENT CLEAN, HIGH-VARIABLE LOAD RATE COAL-FIRED POWER GENERATION SYSTEM AND OPERATION METHOD THEREOF

CROSS REFERENCE OF RELATED APPLICATION

This is a U.S. National Stage under 35 U.S.C 371 of the International Application PCT/CN2021/073590, filed Jan. 25, 2021, which claims priority under 35 U.S.C. 119(a-d) to CN 202010445472.3, filed May 24, 2020.

BACKGROUND OF THE PRESENT INVENTION

Field of Invention

The present invention relates to the field of coal-fired power generation, and more particularly to a high-efficient clean, high-variable load rate coal-fired power generation system and an operation method thereof.

Description of Related Arts

In recent years, renewable energy power generation has gradually developed and grown, the proportion of power generation and installed capacity of coal-fired units has gradually decreased, and it is normal that coal-fired units have been operating under low load conditions for a long time. In addition, in order to fully absorb renewable energy power generation and at the same time reduce the impact of load fluctuations of renewable energy power generation on power grid, coal-fired units frequently participate in peak-shaving and variable-load tasks.

SCR (selective catalytic reduction) denitration catalyst has high activity and high denitration efficiency in the range of 300° C. to 400° C. In order for the coal-fired unit to have a higher denitration efficiency in the full range of operating conditions, it is necessary to ensure that the temperature of the SCR catalyst layer is consistent with the high efficient temperature zone of the catalyst. The temperature of flue gas at the outlet of the fuel which is located at the tail portion of the boiler decreases as the load decreases. When the coal-fired unit operates at low load, the temperature of flue gas gradually approaches the edge of the high activity range of the SCR catalyst. In order to maintain the temperature of flue gas at the outlet of the fuel which is located at the tail portion of the boiler at low load, the flow direction of working fluid inside the coal-fired unit could be changed or the heating surface could be reduced. In addition to the method of reconstructing the heating surface of the coal-fired unit, the heat distribution of each part of the coal-fired unit is also able to be adjusted, such as economizer bypass or adding an auxiliary high-pressure heater.

SUMMARY OF THE PRESENT INVENTION

In order to overcome the shortcomings of above prior arts, the present invention provides a high-efficient clean, high-variable load rate coal-fired power generation system and an operation method thereof. The coal-fired power generation system is able to perform optical temperature adjustment on the internal thermal source SCR denitration catalytic module when the coal-fired unit runs in different load ranges, thereby ensuring that the SCR catalyst to operate in the optimal activity range of denitration catalyst.

To achieve the above object, the present invention provides technical solutions as follows.

A high-efficient clean, high-variable load rate coal-fired power generation system comprises a boiler, a thermal storage medium heater, an economizer and an internal thermal source selective catalytic reduction (SCR) denitration catalytic module, wherein the thermal storage medium heater, the economizer and the internal thermal source SCR denitration catalytic module are distributed in a flue which is located at a tail portion of the boiler along a flow direction of flue gas in sequence, a cold thermal storage medium port of the internal thermal source SCR denitration catalytic module is connected with a first port of a low temperature storage tank through a second thermal storage medium pump and a first thermal storage medium control valve, the cold thermal storage medium port of the internal thermal source SCR denitration catalytic module is also connected with the first port of the low temperature storage tank through a third thermal storage medium pump and a second thermal storage medium control valve, a hot thermal storage medium port of the internal thermal source SCR denitration catalytic module is connected with a first port of a high temperature storage tank, the hot thermal storage medium port is located above the cold thermal storage medium port; a cold thermal storage medium inlet of the thermal storage medium heater is connected with a second port of the low temperature storage tank through a first thermal storage medium pump; a hot thermal storage medium outlet of the thermal storage medium heater is connected with a second port of the high temperature storage tank, a third port of the high temperature storage tank is connected with a thermal storage medium inlet of a thermal storage feedwater heater, a thermal storage medium outlet of the thermal storage feedwater heater is connected with a third port of the low temperature storage tank through a fourth thermal storage medium pump, a feedwater inlet of the thermal storage feedwater heater is connected with a feedwater pump through a second feedwater control valve, a feedwater outlet of the thermal storage feedwater heater is connected with a feedwater inlet of the economizer, the feedwater inlet of the economizer is also connected with the feedwater pump through a first feedwater control valve and a high pressure heater group for steam turbine regenerative system in sequence.

Preferably, the internal thermal source SCR denitration catalytic module comprises a heating unit and a catalytic unit connected with the heating unit, the heating unit comprises a thermal exchange tube set and a catalyst coating coated on the thermal exchange tube set.

Preferably, all of the first, second, third and fourth thermal storage medium pumps are variable frequency pumps.

Preferably, the thermal storage medium used in the coal-fired power generation system is thermal conducting oil.

Also, the present invention provides an operation method of the high-efficient clean, high-variable load rate coal-fired power generation system. The operation method comprises steps of:

(A) adjusting an operating temperature of the internal thermal source SCR denitration catalytic module through adjusting the second thermal storage medium pump, the third thermal storage medium pump, the first thermal storage medium control valve and the second thermal storage medium control valve, which comprises:

(A1) measuring an inlet gas temperature of the internal thermal source SCR denitration catalytic module, going directly to (A2) if the inlet gas temperature of the internal thermal source SCR denitration catalytic module is higher than a maximum operating temperature thereof, and going directly to (A3) if the inlet gas temperature of the internal thermal source SCR denitration catalytic module is lower than a minimum operating temperature thereof;

(A2) opening the first thermal storage medium control valve and the second thermal storage medium pump, closing the second thermal storage medium control valve and the third thermal storage medium pump, adjusting a rotational speed of the second thermal storage medium pump, cooling inlet gas of the internal thermal source SCR denitration catalytic module by cold thermal storage medium in the low temperature storage tank, converting the cold thermal storage medium into hot thermal storage medium based on heat exchange principle, storing the hot thermal storage medium in the high temperature storage tank, so as to control an interior gas temperature of the internal thermal source SCR denitration catalytic module in a range of the operating temperature thereof;

(A3) closing the first thermal storage medium control valve and the second thermal storage medium pump, opening the second thermal storage medium control valve and the third thermal storage medium pump, adjusting a rotational speed of the third thermal storage medium pump, heating inlet gas of the internal thermal source SCR denitration catalytic module by hot thermal storage medium in the high temperature storage tank, converting the hot thermal storage medium into cold thermal storage medium based on heat exchange principle, storing the cold thermal storage medium in the low temperature storage tank, so as to control an interior gas temperature of the internal thermal source SCR denitration catalytic module in a range of the operating temperature thereof;

(B) calculating a thermal storage capacity of the high temperature storage tank and the low temperature storage tank, opening the first thermal storage medium pump if the thermal storage capacity is insufficient, and heating the cold thermal storage medium in the thermal storage medium heater; and (C) when the coal-fired power generation system needs to rapidly increase load, opening the second feedwater control valve, reducing an opening degree of the first feedwater control valve; meanwhile, opening the fourth thermal storage medium pump, and adjusting a rotational speed of the fourth thermal storage medium pump and an opening degree of the second feedwater control valve, so as to adjust a power output of the coal-fired power generation system.

The operating temperature of the internal thermal source SCR denitration catalytic module is in a range of 300° C. to 400° C.

Compared with prior arts, the present invention has some advantages as follows.

(1) The present invention is able to expand the denitration operation range of SCR denitration catalytic system, and realize high-efficiency denitrification in all operating conditions.

(2) The present invention is able to increase the ramp rate of the coal-fired unit to more than 2.5% of the rated load/minute.

(3) The present invention is able to improve the operating efficiency of the coal-fired boiler in all operating conditions and improve the operating efficiency of the coal-fired boiler by about 0.3%.

DETAILED DESCRIPTION OF THE PREFERRED EMBODIMENT

The present invention is further explained in combination with drawings and embodiments in detail as follows.

Figure 1:
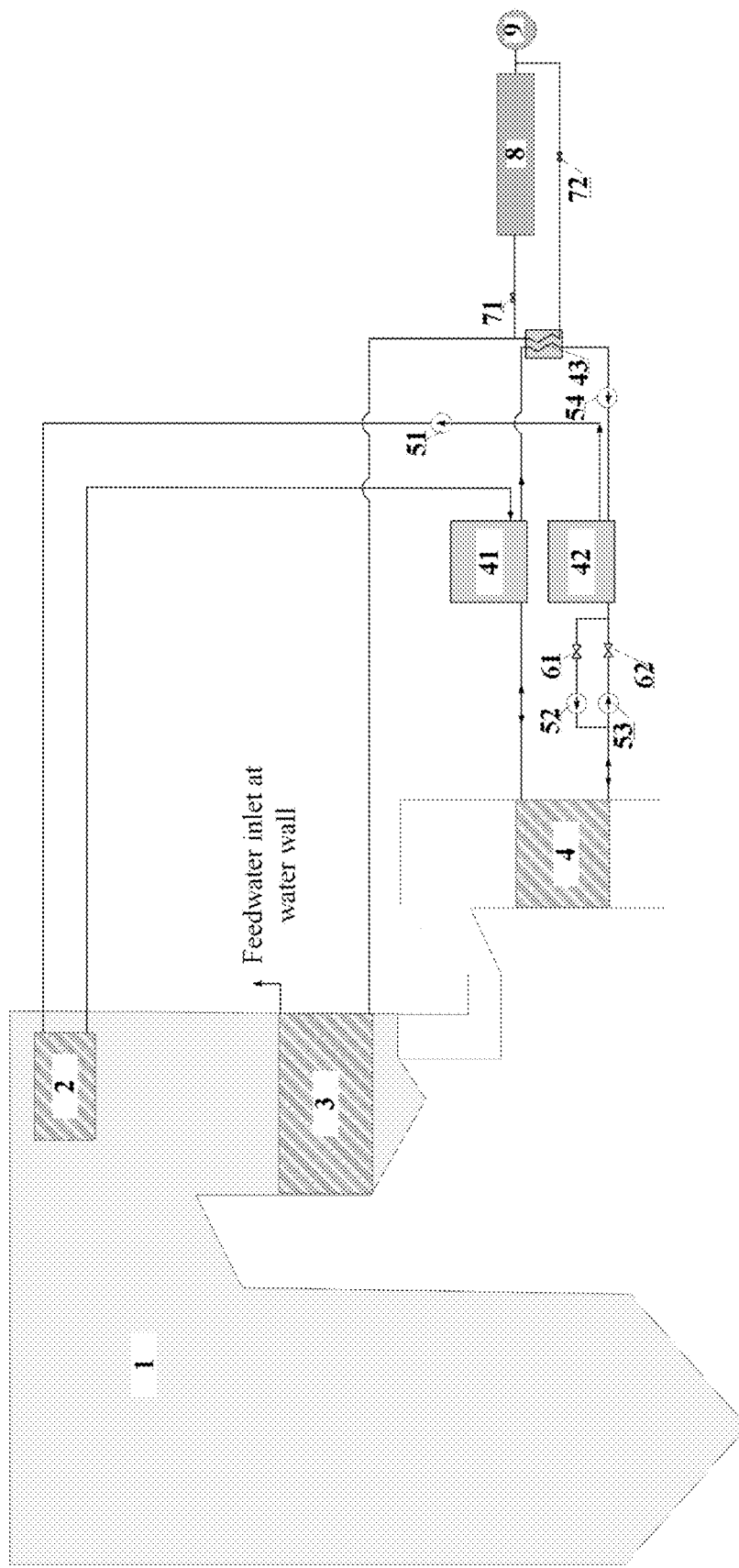
FIG. 1 is a structurally schematic view of a high-efficient clean, high-variable load rate coal-fired power generation system provided by the present invention.

Referring to FIG. 1, a high-efficient clean, high-variable load rate coal-fired power generation system according to a preferred embodiment of the present invention is illustrated, wherein the coal-fired power generation system comprises a boiler 1, a thermal storage medium heater 2, an economizer 3 and an internal thermal source selective catalytic reduction (SCR) denitration catalytic module 4, wherein the thermal storage medium heater 2, the economizer 3 and the internal thermal source SCR denitration catalytic module 4 are distributed in a flue which is located at a tail portion of the boiler 1 along a flow direction of flue gas in sequence, a cold thermal storage medium port of the internal thermal source SCR denitration catalytic module 4 is connected with a first port of a low temperature storage tank 42 through a second thermal storage medium pump 52 and a first thermal storage medium control valve 61, the cold thermal storage medium port of the internal thermal source SCR denitration catalytic module 4 is also connected with the first port of the low temperature storage tank 42 through a third thermal storage medium pump 53 and a second thermal storage medium control valve 62, a hot thermal storage medium port of the internal thermal source SCR denitration catalytic module 4 is connected with a first port of a high temperature storage tank 41, the hot thermal storage medium port is located above the cold thermal storage medium port; a cold thermal storage medium inlet of the thermal storage medium heater 2 is connected with a second port of the low temperature storage tank 42 through a first thermal storage medium pump 51; a hot thermal storage medium outlet of the thermal storage medium heater 2 is connected with a second port of the high temperature storage tank 41, a third port of the high temperature storage tank 41 is connected with a thermal storage medium inlet of a thermal storage feedwater heater 43, a thermal storage medium outlet of the thermal storage feedwater heater 43 is connected with a third port of the low temperature storage tank 42 through a fourth thermal storage medium pump 54, a feedwater inlet of the thermal storage feedwater heater 43 is connected with a feedwater pump 9 through a second feedwater control valve 72, a feedwater outlet of the thermal storage feedwater heater 43 is connected with a feedwater inlet of the economizer 3, the feedwater inlet of the economizer 3 is also connected with the feedwater pump 9 through a first feedwater control valve 71 and a high pressure heater group 8 for steam turbine regenerative system in sequence.

Figure 2:
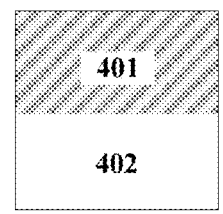
FIG. 2 is a structurally schematic view of an internal thermal source selective catalytic reduction (SCR) denitration catalytic module of the coal-fired power generation system provided by the present invention.
Figure 3:
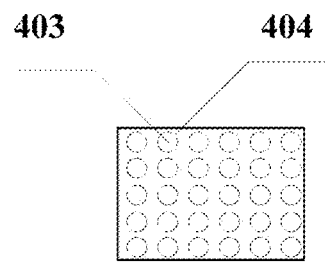
FIG. 3 is a structurally schematic view of a heating unit of the internal thermal source SCR denitration catalytic module provided by the present invention.

Preferably, referring to FIGS. 2 and 3, the internal thermal source SCR denitration catalytic module 4 comprises a heating unit 401 and a catalytic unit 402 connected with the heating unit 401, the heating unit 401 comprises a thermal exchange tube set 403 and a catalyst coating 404 coated on the thermal exchange tube set 403.

Preferably, all of the first, second, third and fourth thermal storage medium pumps 51, 52, 53 and 54 are variable frequency pumps, which is able to improve the accuracy of parameter adjustment of the coal-fired power generation system and to keep the coal-fired power generation system running at optimal parameters.

Preferably, the thermal storage medium used in the coal-fired power generation system is thermal conducting oil, which is low in cost and is able to perform better temperature area matching with every energy utilization link.

Also, the present invention provides an operation method of the high-efficient clean, high-variable load rate coal-fired power generation system. The operation method comprises steps of:

(A) adjusting an operating temperature of the internal thermal source SCR denitration catalytic module 4 through adjusting the second thermal storage medium pump 52, the third thermal storage medium pump 53, the first thermal storage medium control valve 61 and the second thermal storage medium control valve 62, which comprises:

(A1) measuring an inlet gas temperature of the internal thermal source SCR denitration catalytic module 4, going directly to (A2) if the inlet gas temperature of the internal thermal source SCR denitration catalytic module 4 is higher than a maximum operating temperature thereof, and going directly to (A3) if the inlet gas temperature of the internal thermal source SCR denitration catalytic module 4 is lower than a minimum operating temperature thereof;

(A2) opening the first thermal storage medium control valve 61 and the second thermal storage medium pump 52, closing the second thermal storage medium control valve 62 and the third thermal storage medium pump 53, adjusting a rotational speed of the second thermal storage medium pump 52, cooling inlet gas of the internal thermal source SCR denitration catalytic module 4 by cold thermal storage medium in the low temperature storage tank 42, converting the cold thermal storage medium into hot thermal storage medium based on heat exchange principle, storing the hot thermal storage medium in the high temperature storage tank 41, so as to control an interior gas temperature of the internal thermal source SCR denitration catalytic module 4 in a range of the operating temperature thereof;

(A3) closing the first thermal storage medium control valve 61 and the second thermal storage medium pump 52, opening the second thermal storage medium control valve 62 and the third thermal storage medium pump 53, adjusting a rotational speed of the third thermal storage medium pump 53, heating inlet gas of the internal thermal source SCR denitration catalytic module 4 by hot thermal storage medium in the high temperature storage tank 41, converting the hot thermal storage medium into cold thermal storage medium based on heat exchange principle, storing the cold thermal storage medium in the low temperature storage tank 42, so as to control an interior gas temperature of the internal thermal source SCR denitration catalytic module 4 in a range of the operating temperature thereof;

(B) measuring a volume of the high temperature thermal storage medium in the high temperature storage tank 41 and a volume of the low temperature thermal storage medium in the low temperature storage tank 42, calculating a thermal storage capacity of the high temperature storage tank 41 and the low temperature storage tank 42 by a thermal storage temperature difference therebetween, opening the first thermal storage medium pump 51 if the thermal storage capacity is insufficient, and heating the cold thermal storage medium in the thermal storage medium heater 2; and (C) when the coal-fired power generation system needs to rapidly increase load, opening the second feedwater control valve 72, reducing an opening degree of the first feedwater control valve 71; meanwhile, opening the fourth thermal storage medium pump 54, and adjusting a rotational speed of the fourth thermal storage medium pump 54 and an opening degree of the second feedwater control valve 72, so as to adjust a power output of the coal-fired power generation system.

The operating temperature of the internal thermal source SCR denitration catalytic module 4 is in a range of 300° C. to 400° C.

According to the present invention, the high temperature storage tank 41 is integrated with the low temperature storage tank 42, and the temperature of SCR catalyst layer is controlled through peak cut of heat of the boiler for ensuring that the catalyst has high activity. Through the internal thermal source SCR denitration catalytic module 4 coupled with the high temperature storage tank 41 and the low temperature storage tank 42, the operating temperature of the internal thermal source SCR denitration catalytic module 4 is controlled in a range of 300° C. to 400° C. in full operating conditions, ensuring that the SCR catalyst has high activity in full-working conditions, thereby improving the SCR denitration efficiency. Moreover, the high temperature storage tank 41 and the low temperature storage tank 42 are coupled with the high pressure heater group 8 for steam turbine regenerative system, so that when the coal-fired unit needs the increase in variable load rate, the thermal storage energy is quickly converted into power for outputting, thereby improving the ramp rate of the coal-fired unit. In addition, a part of energy stored in the high temperature storage tank 41 and the low temperature storage tank 42 come from the internal thermal source SCR denitration catalytic module 4, another part of the energy stored in the high temperature storage tank 41 and the low temperature storage tank 42 come from the thermal storage medium heater 2 located within the boiler 1, the operational flexibility of the coal-fired unit is effectively improved through peak cut in each load of boiler, and simultaneously the boiler efficiency under full working conditions is improved.

Figure 4:
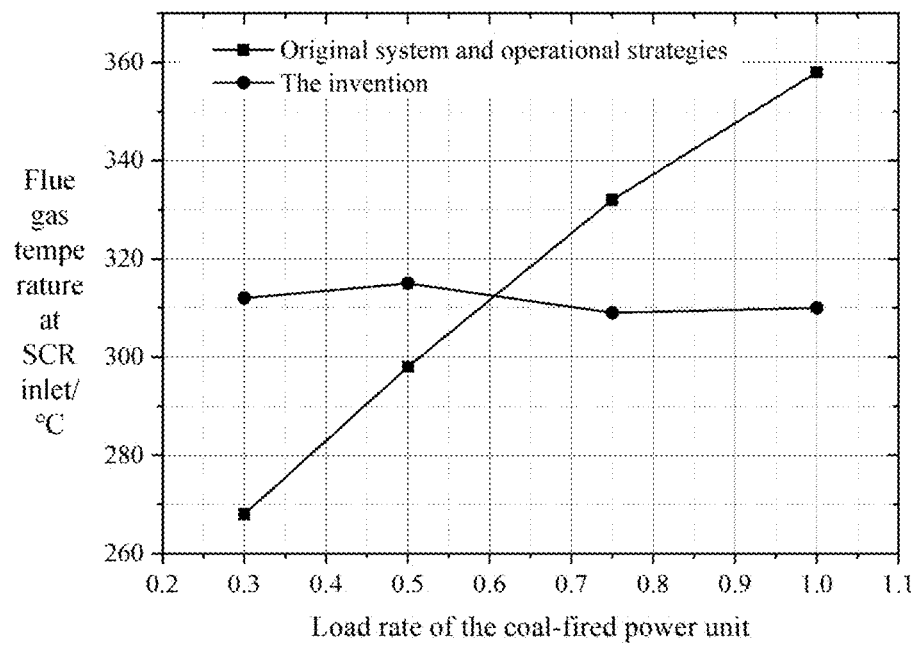
FIG. 4 is a contrast diagram of the outlet gas temperature of the internal thermal source SCR denitration catalytic module of the present invention and the prior art.

The coal-fired power generation system provided by the present invention is able to perform optical temperature adjustment on the internal thermal source SCR denitration catalytic module when the coal-fired unit runs in different load ranges, thereby maintaining the SCR catalyst to operate in the optimal operating range of denitration catalyst activity. Referring to FIG. 4, when the load rate of the coal-fired power generation system provided by the present invention is below 0.5, the outlet gas temperature of SCR is above 310° C.

What is claimed is:

1. A high-efficient clean, high-variable load rate coal-fired power generation system, comprising a boiler (1), a thermal storage medium heater (2), an economizer (3) and an internal thermal source selective catalytic reduction (SCR) denitration catalytic module (4), wherein:

the thermal storage medium heater (2), the economizer (3) and the internal thermal source SCR denitration catalytic module (4) are distributed in a flue which is located at a tail portion of the boiler (1) along a flow direction of flue gas in sequence;

a cold thermal storage medium port of the internal thermal source SCR denitration catalytic module (4) is connected with a first port of a low temperature storage tank (42) through a second thermal storage medium pump (52) and a first thermal storage medium control valve (61), the cold thermal storage medium port of the internal thermal source SCR denitration catalytic module (4) is also connected with the first port of the low temperature storage tank (42) through a third thermal storage medium pump (53) and a second thermal storage medium control valve (62), a hot thermal storage medium port of the internal thermal source SCR denitration catalytic module (4) is connected with a first port of a high temperature storage tank (41), the hot thermal storage medium port is located above the cold thermal storage medium port;

a cold thermal storage medium inlet of the thermal storage medium heater (2) is connected with a second port of the low temperature storage tank (42) through a first thermal storage medium pump (51); a hot thermal storage medium outlet of the thermal storage medium heater (2) is connected with a second port of the high temperature storage tank (41);

a third port of the high temperature storage tank (41) is connected with a thermal storage medium inlet of a thermal storage feedwater heater (43), a thermal storage medium outlet of the thermal storage feedwater heater (43) is connected with a third port of the low temperature storage tank (42) through a fourth thermal storage medium pump (54), a feedwater inlet of the thermal storage feedwater heater (43) is connected with a feedwater pump (9) through a second feedwater control valve (72), a feedwater outlet of the thermal storage feedwater heater (43) is connected with a feedwater inlet of the economizer (3), the feedwater inlet of the economizer (3) is also connected with the feedwater pump (9) through a first feedwater control valve (71) and a high pressure heater group (8) for steam turbine regenerative system in sequence;

the internal thermal source SCR denitration catalytic module (4) comprises a heating unit (401) and a catalytic unit (402) connected with the heating unit (401), the heating unit (401) comprises a thermal exchange tube set (403) and a catalyst coating (404) coated on the thermal exchange tube set (403);

all of the first, second, third and fourth thermal storage medium pumps (51), (52), (53) and (54) are variable frequency pumps;

the thermal storage medium used in the coal-fired power generation system is thermal conducting oil.

2. An operation method of the high-efficient clean, high-variable load rate coal-fired power generation system according to claim 1, the operation method comprising steps of:

(A) adjusting an operating temperature of the internal thermal source SCR denitration catalytic module (4) through adjusting the second thermal storage medium pump (52), the third thermal storage medium pump (53), the first thermal storage medium control valve (61) and the second thermal storage medium control valve (62), which comprises:

(A1) measuring an inlet gas temperature of the internal thermal source SCR denitration catalytic module (4), going directly to (A2) if the inlet gas temperature of the internal thermal source SCR denitration catalytic module (4) is higher than a maximum operating temperature thereof, and going directly to (A3) if the inlet gas temperature of the internal thermal source SCR denitration catalytic module (4) is lower than a minimum operating temperature thereof;

(A2) opening the first thermal storage medium control valve (61) and the second thermal storage medium pump (52), closing the second thermal storage medium control valve (62) and the third thermal storage medium pump (53), adjusting a rotational speed of the second thermal storage medium pump (52), cooling inlet gas of the internal thermal source SCR denitration catalytic module (4) by cold thermal storage medium in the low temperature storage tank (42), converting the cold thermal storage medium into hot thermal storage medium based on heat exchange principle, storing the hot thermal storage medium in the high temperature storage tank (41), so as to control an interior gas temperature of the internal thermal source SCR denitration catalytic module (4) in a range of the operating temperature thereof;

(A3) closing the first thermal storage medium control valve (61) and the second thermal storage medium pump (52), opening the second thermal storage medium control valve (62) and the third thermal storage medium pump (53), adjusting a rotational speed of the third thermal storage medium pump (53), heating inlet gas of the internal thermal source SCR denitration catalytic module (4) by hot thermal storage medium in the high temperature storage tank (41), converting the hot thermal storage medium into cold thermal storage medium based on heat exchange principle, storing the cold thermal storage medium in the low temperature storage tank (42), so as to control an interior gas temperature of the internal thermal source SCR denitration catalytic module (4) in a range of the operating temperature thereof;

(B) calculating a thermal storage capacity of the high temperature storage tank (41) and the low temperature storage tank (42), opening the first thermal storage medium pump (51) if the thermal storage capacity is insufficient, and heating the cold thermal storage medium in the thermal storage medium heater (2); and (C) when the coal-fired power generation system needs to rapidly increase load, opening the second feedwater control valve (72), reducing an opening degree of the first feedwater control valve (71); meanwhile, opening the fourth thermal storage medium pump (54), and adjusting a rotational speed of the fourth thermal storage medium pump (54) and an opening degree of the second feedwater control valve (72), so as to adjust a power output of the coal-fired power generation system, wherein the operating temperature of the internal thermal source SCR denitration catalytic module (4) is in a range of 300° C. to 400° C.

\* \* \* \* \*